US010543977B2

(12) United States Patent
Brockman et al.

(10) Patent No.: US 10,543,977 B2
(45) Date of Patent: Jan. 28, 2020

(54) PRESSURE REGULATED BEVERAGE CARTRIDGES

(71) Applicant: Starbucks Corporation, Seattle, WA (US)

(72) Inventors: John Brockman, Seattle, WA (US); Charles Cook, Seattle, WA (US); Lauren Ewer, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 1072 days.

(21) Appl. No.: 14/977,190

(22) Filed: Dec. 21, 2015

(65) Prior Publication Data

US 2016/0176625 A1 Jun. 23, 2016

Related U.S. Application Data

(60) Provisional application No. 62/096,076, filed on Dec. 23, 2014.

(51) Int. Cl.
*B65D 85/804* (2006.01)
*A47J 31/40* (2006.01)
*A47J 31/36* (2006.01)

(52) U.S. Cl.
CPC ...... *B65D 85/8043* (2013.01); *A47J 31/3676* (2013.01); *A47J 31/407* (2013.01)

(58) Field of Classification Search
CPC .. A47J 31/407; A47J 31/0668; A47J 31/0663; A47J 31/0673; A47J 31/0678; A47J 31/3676; A47J 31/3685; B65D 85/8043; B65D 85/8046
See application file for complete search history.

(56) References Cited

U.S. PATENT DOCUMENTS

| | | | | |
|---|---|---|---|---|
| 4,915,261 A | * | 4/1990 | Strenger | A47J 31/407 222/107 |
| 7,856,920 B2 | * | 12/2010 | Schmed | A47J 31/0673 99/295 |
| 10,051,988 B2 | * | 8/2018 | Gordon | A47J 31/407 |
| 2010/0178404 A1 | * | 7/2010 | Yoakim | A47J 31/22 426/431 |
| 2012/0121765 A1 | * | 5/2012 | Kamerbeek | A47J 31/368 426/77 |
| 2012/0171334 A1 | * | 7/2012 | Yoakim | A47J 31/22 426/87 |
| 2013/0239817 A1 | * | 9/2013 | Starr | A47J 31/462 99/280 |
| 2014/0238249 A1 | * | 8/2014 | Mariller | A47J 31/3623 99/295 |
| 2014/0272018 A1 | | 9/2014 | Koller et al. | |
| 2014/0356501 A1 | | 12/2014 | Juris et al. | |
| 2015/0257580 A1 | | 9/2015 | Crarer et al. | |

(Continued)

*Primary Examiner* — Janie M Loeppke

(74) *Attorney, Agent, or Firm* — Knobbe, Martens, Olson & Bear, LLP

(57) ABSTRACT

Various embodiments of pressure regulated beverage cartridges are disclosed. In some embodiments, a system includes a cartridge and a beverage preparation machine. The cartridge and machine can be configured such that, when the cartridge is received in the machine, a pressure of less than a limit value is maintained in the cartridge during the beverage preparation process, which can improve the flavor of certain beverages, such as brewed coffee beverages.

11 Claims, 12 Drawing Sheets

(56) References Cited

U.S. PATENT DOCUMENTS

2015/0257585 A1  9/2015 Crarer et al.
2015/0257586 A1  9/2015 DiNucci et al.
2015/0289709 A1* 10/2015 Picozza ............... A47J 31/4482
                                                     426/231

* cited by examiner

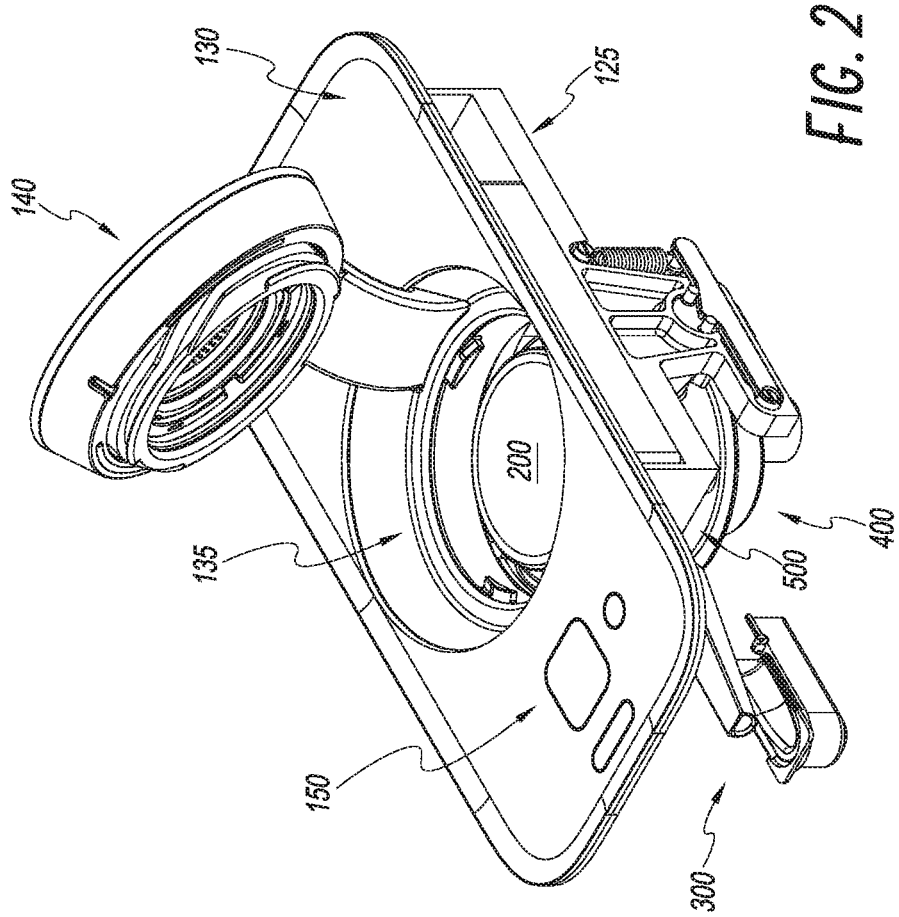

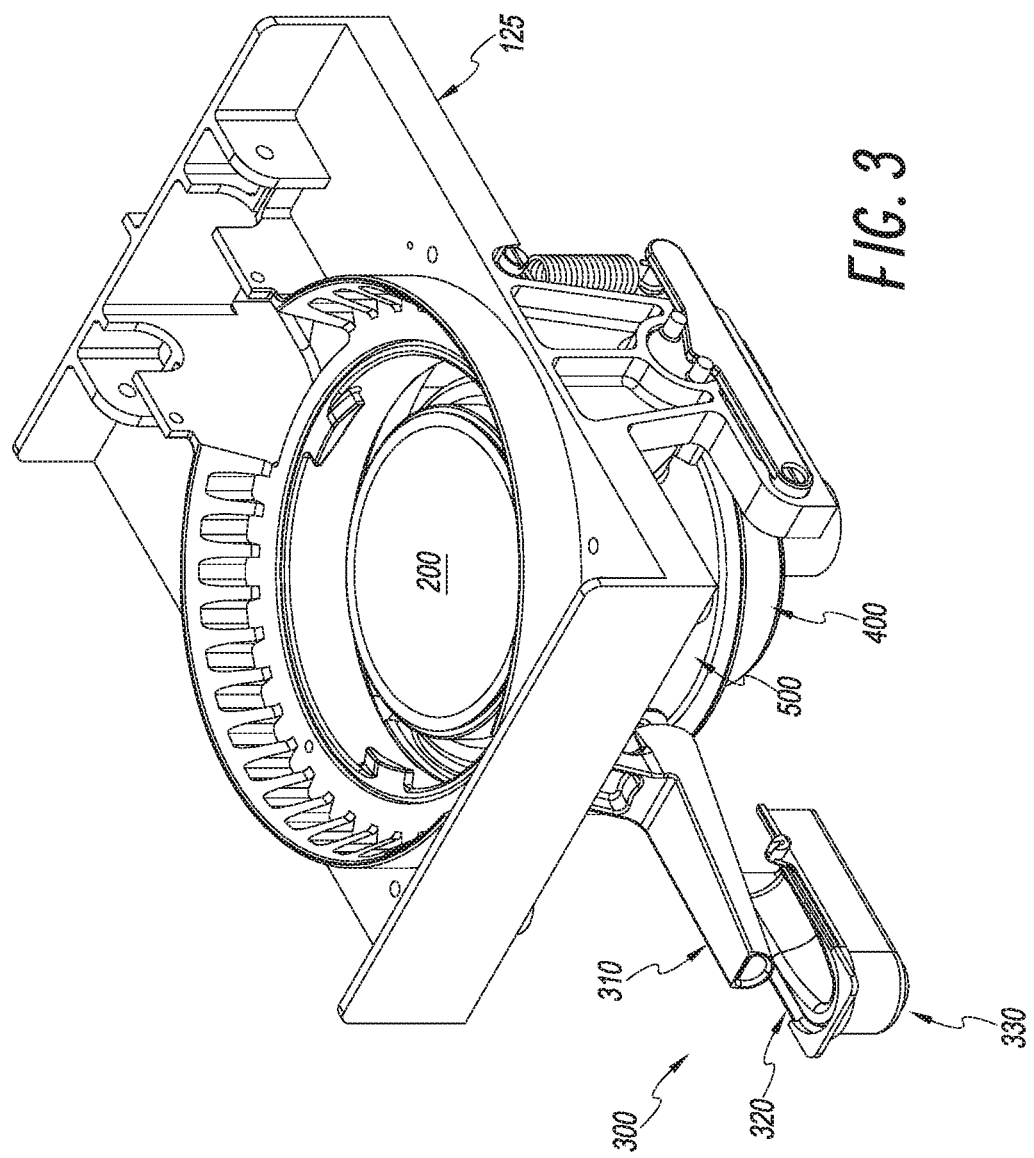

$BT_m := 80 \cdot s$ — Measured brew time for said pod size $Q_m := \dfrac{V}{BT_m}$  $Q_m = 0.111 \, \dfrac{fl\,oz}{s}$ — Calculated flow rate based on brew time $v_m := \dfrac{4 \cdot Q_m}{\pi \cdot D_2^2}$  $v_m = 3.324 \, \dfrac{ft}{s}$ — Fluid velocity based on brew time $P_{2measured} := 3 \cdot psi$ — Pressure gauge readout from experiment $P_{2m(absolute)} := P_{2measured} + P_{atm}$ — Gauge pressure converted to absolute $vH_{measured} := \dfrac{v_m^2}{2 \cdot g}$ — Calculated velocity head based on brew time $vH_{measured} = 0.172 \, ft.$ $h_{5m} := k_5 \cdot vH_{measured}$ — Minor loss of tee calculated with velocity head $Re_{200m} := \dfrac{v_m \cdot D_2}{\upsilon_{200}}$ — Reynolds number calculated from experiment $f_{Hm} := \dfrac{0.25}{\left( \log\left( \dfrac{\dfrac{\epsilon}{D_2}}{3.7} + \dfrac{5.74}{Re_{200m}^{0.9}} \right) \right)^2}$ — Major loss friction factor through tubing Swamee-Jain equation $H_{5m} := f_{Hm} \cdot \dfrac{L_5}{D_2} \cdot vH_{measured}$ — Major loss through tubing $P_2 = g \cdot \rho_{200} \cdot \left( H_5 + h_5 + h_6 - z_2 + z_{atm} - vH + \dfrac{P_{atm}}{g \cdot \rho_{200}} \right)$ — Energy balance equation from gauge to pod exit $k_6 \cdot vH = vH - h_5 - H_5 + z_2 - x_{atm} + \dfrac{P_2 - P_{atm}}{g \cdot \rho_{200}}$ — Energy balance equation rearranged to solve for pod minor head loss in terms of loss coefficient $k_6 := - \dfrac{H_{5m} + h_{5m} - vH_m - z_2 + z_{atm} - \dfrac{P_{2m(absolute)} - P_{atm}}{g \cdot \rho_{200}}}{vH_m}$ — Energy balance rearranged to solve for minor loss coefficient (m = measured)

$k_6 = 44.785$ — Pod minor loss coefficient $h_6 := k_6 \cdot vH$ — Minor head loss calculated

FIG. 7B

PRESSURE REGULATED BEVERAGE CARTRIDGES

CROSS REFERENCE

This application claims a priority benefit under 35 U.S.C. § 119 of U.S. Patent Application No. 62/096,076, filed Dec. 23, 2014, the entirety of which is hereby incorporated by reference herein.

FIELD

The present disclosure relates to beverage brewing devices (e.g., brewing machines, single-serve cartridges, etc.) and methods, and more specifically to beverage devices and methods that can regulate the pressure at which a beverage is produced.

DESCRIPTION OF CERTAIN RELATED ART

Single-serve beverage machines are devices that are designed to produce a single serving, or sometimes a single cup, of a desired beverage. In comparison to other types of beverage machines (such as drip coffee makers having a multi-cup carafe), single-serve beverage machines can enhance convenience by reducing the time to prepare the beverage.

Some single-serve beverage machines use a cartridge or capsule containing one or more beverage components or precursors to produce the beverage. Generally, such cartridges are received in the single-serve beverage machine, are used to produce the single serving of the beverage, and are subsequently manually removed from the machine and discarded.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 2 illustrates a perspective view of an upper portion of the beverage production machine of FIG. 1, with a lid in an open position and a cartridge received in the main housing.

FIG. 3 illustrates a perspective view of a portion of the upper portion of the beverage production machine shown in FIG. 2, with certain features hidden to show a beverage production assembly and a frame.

FIG. 7B shows certain calculations regarding determination of a head loss coefficient.

DETAILED DESCRIPTION OF CERTAIN EMBODIMENTS

Various beverage production devices and methods are described below to illustrate various examples that may be employed to achieve one or more desired improvements. These examples are only illustrative and not intended in any way to restrict the general disclosure presented and the various aspects and features of the disclosure. The general principles described herein may be applied to embodiments and applications other than those detailed below without departing from the spirit and scope of the disclosure. Indeed, the present embodiments are not intended to be limited to the particular embodiments shown, but are to be accorded the widest scope consistent with the principles and features disclosed or suggested herein. Certain aspects, advantages, and features of the inventions have been described herein. It is not necessary that any or all such aspects, advantages, and features are achieved in accordance with any particular embodiment. Some embodiments may not achieve the advantages described herein, but may achieve different advantages instead. Any structure, feature, or element in one example is contemplated to be used in place of or in addition to any structure, feature, or element of any other example. No features, structure, or element disclosed herein is essential or indispensable.

Beverage Preparation Machine

Figure 1:
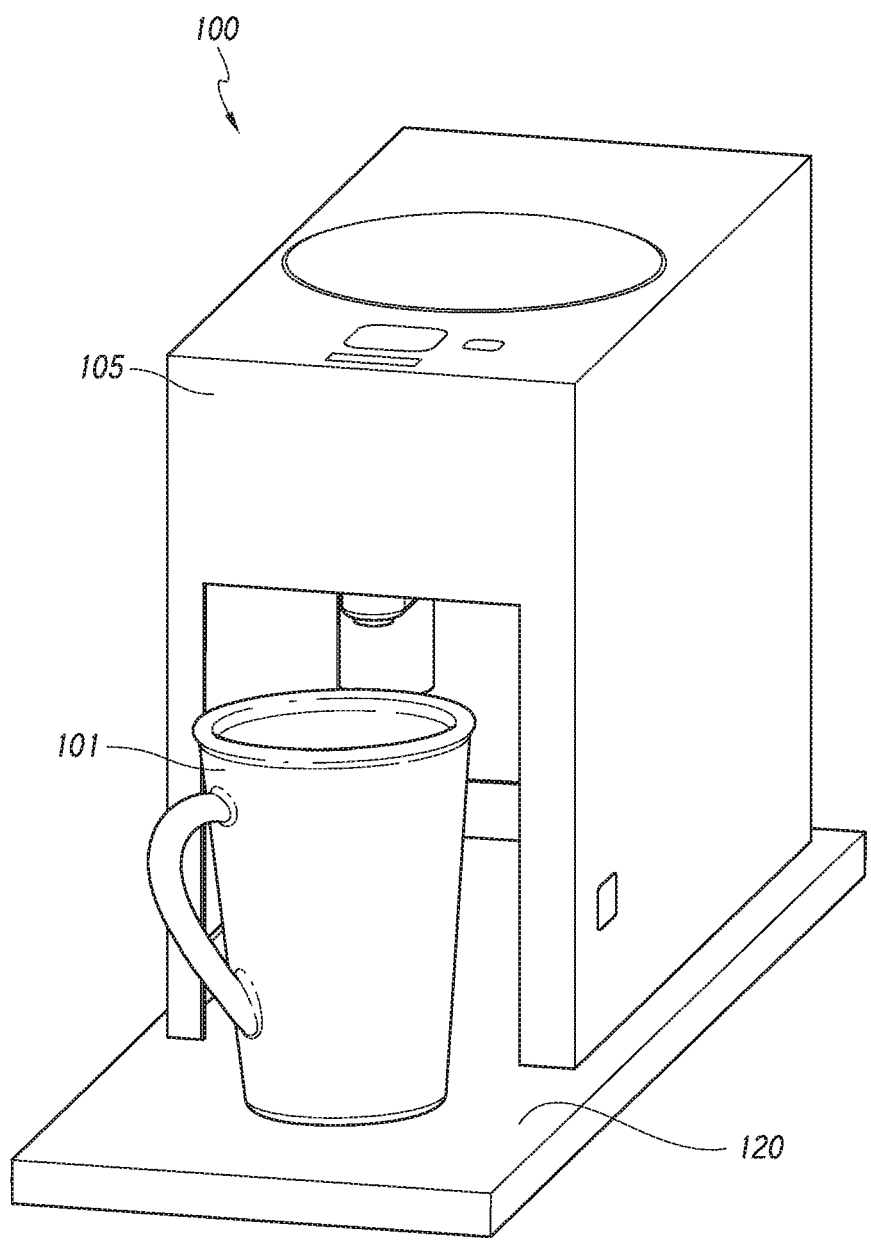
FIG. 1 illustrates an embodiment of a beverage production machine including a main housing.

FIG. 1 illustrates a perspective view of an embodiment of a beverage preparation machine 100 that is configured to dispense a beverage into a cup 101 or other vessel. The beverage preparation machine 100 can include one or more of a main housing 105, liquid reservoir, and frother unit. In some embodiments, one or more of the components of the beverage preparation machine 100 are housed on and/or partially in a tray 120.

The liquid reservoir can be located within or external to the housing 105. The liquid reservoir can be in fluid communication (e.g., via tubing or pipes) with the main housing 105 to provide liquid (e.g., water) stored within the liquid reservoir to a chamber within the main housing 105 where the beverage is prepared. In various embodiments, the liquid is pre-heated before entering the chamber. For example, the liquid may be heated within a separate storage reservoir or within fluid supply lines as the liquid travels to the chamber. The amount of liquid (e.g., water) provided to the chamber from the liquid reservoir may be determined by a beverage recipe. The liquid reservoir may include a water level sensor configured to determine whether enough liquid is present in the liquid reservoir to prepare a requested beverage. The frother unit can cause the beverage to be dispensed with a froth of bubbles (e.g., a frothed milk). After dispensing a brewed beverage into the cup 101, the frothed liquid (e.g., frothed milk) can be poured into the beverage. The frother unit may include a control input to toggle the frothing on and off. The frother unit can be located within or external to the housing 105.

As shown in FIGS. 2 and 3, the main housing 105 can include a frame 125 that supports a beverage production assembly 400 having a basket unit 500, such as a multi-chambered basket unit. As also shown, an upper portion of the main housing 105 can include a top 130 with an opening 135 to facilitate the loading of a single-serve beverage cartridge 200 (e.g., a single-serve cartridge with a porous upper and/or lower surface) into the basket unit 500. The cartridge 200 can also be called a pod, capsule, or otherwise. The opening 135 can be selectively opened and closed with a lid assembly 140. Additional details regarding single-serve beverage cartridges and the lid assembly 140 are disclosed in U.S. Application Publication No. 2014/0272018, filed Feb. 26, 2014, the entirety of which is hereby incorporated by reference.

In some embodiments, a single-serve beverage cartridge includes a cartridge body holding a beverage precursor. The cartridge body may comprise any suitable material, including but not limited to, plastic, metal, wood, bio-degradable polymers, etc. The cartridge body may be reusable, recyclable, biodegradable, compostable, commercially compostable, etc. The beverage precursor may comprise, for example, coffee grounds, tea leaves, powdered milk, milk, juice, tea, coffee, green coffee, green coffee extract, coffee extract, flavorings, other beverage materials, etc.

In various embodiments, the main housing 105 includes an input and output unit 150. For example, the input and output unit 150 can include an indicator (e.g., a light, display, dial, or otherwise) to indicate status information, such as whether the main housing 105 has power, is operating, requires maintenance, etc. The input and output unit 150 can include a user-interface member (e.g., a button or switch) to provide instruction to the main housing 105, such as a command to begin the beverage production process. The input and output unit 150 can be connected with a memory and/or a controller, such as a microprocessor.

In some variants, the input and output unit 150 includes a reader. The reader can be configured to read a code (e.g., optical code, one dimensional bar code, two dimensional bar code, etc.) and/or a tag (e.g., a radio frequency identification (RFID) tag or near field communication (NFC) tag) on the cartridge or associated packaging. This can allow the machine 100 to identify the type of beverage to be produced. For example, reading a cartridge containing espresso coffee ingredients (e.g., grounds) can identify to the machine 100 that an espresso beverage is to be produced. In several implementations, the beverage production assembly 400 is adjusted based on the type of beverage to be produced, as is discussed in more detail below. Additional details regarding the reader, as well as associated functions, are disclosed in U.S. Application Publication No. 2015/0257586, filed Mar. 11, 2014, the entirety of which is hereby incorporated by reference.

In some implementations, when the cartridge 200 has been loaded into the basket unit 500 and the lid assembly 140 has been closed, a beverage preparation process can begin. In some embodiments of the beverage preparation process, liquid (e.g., hot water) is introduced into the cartridge 200 to produce a beverage, such as by a discharge head in the lid assembly 140. The beverage can exit the cartridge 200 and be conveyed to the cup 101 through portions of the main housing 105, such as via a dispensing assembly 300.

Figure 4A:
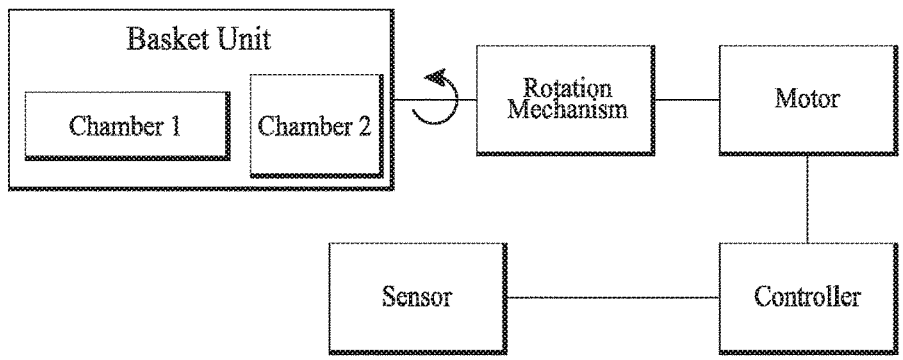
FIGS. 4A, 4B, and 4C schematically illustrate certain embodiments of a beverage production assembly.

FIG. 4A schematically illustrates certain embodiments of the beverage production assembly 400. As shown, the beverage production assembly 400 can include the basket unit 500. As mentioned above, in some embodiments, the basket unit 500 can be a multi-chamber unit that is configured to receive at least two different types of cartridges, such as a first type in a first chamber and a second type in a second chamber. In certain variants, the basket unit 500 can be moved (e.g., rotated), such as by a linkage mechanism that is coupled with a motor. In several embodiments, the movement of the basket unit 500 facilitates loading of a cartridge into, and/or ejection of a cartridge from, the basket unit 500. The movement of the basket unit 500 can be controlled by a controller, which can be configured to operate (e.g., energize and de-energize) the motor. The controller can receive a signal from one or more sensors, such as sensors adapted to detect signs indicative of a position of the basket unit 500, linkage mechanism, or other components.

Figure 4B:
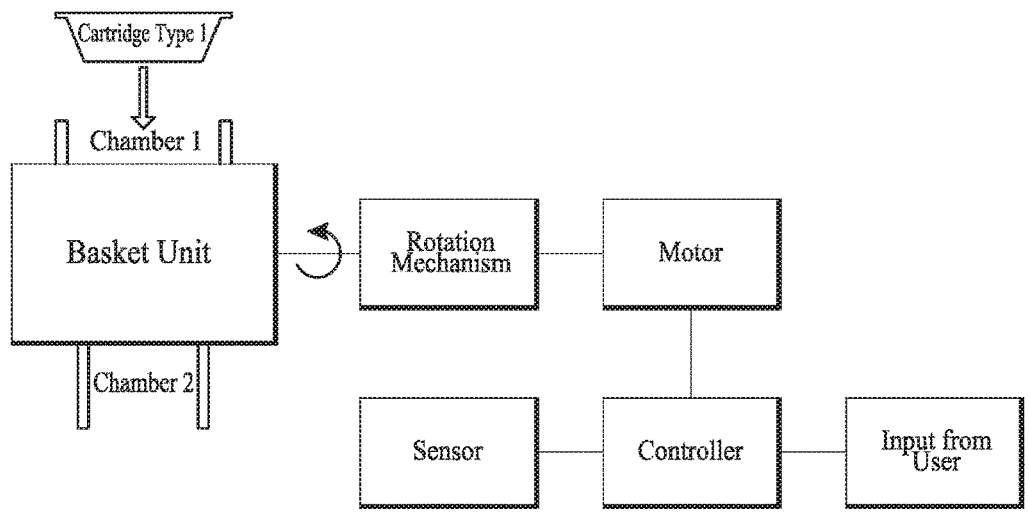
Figure 4C:
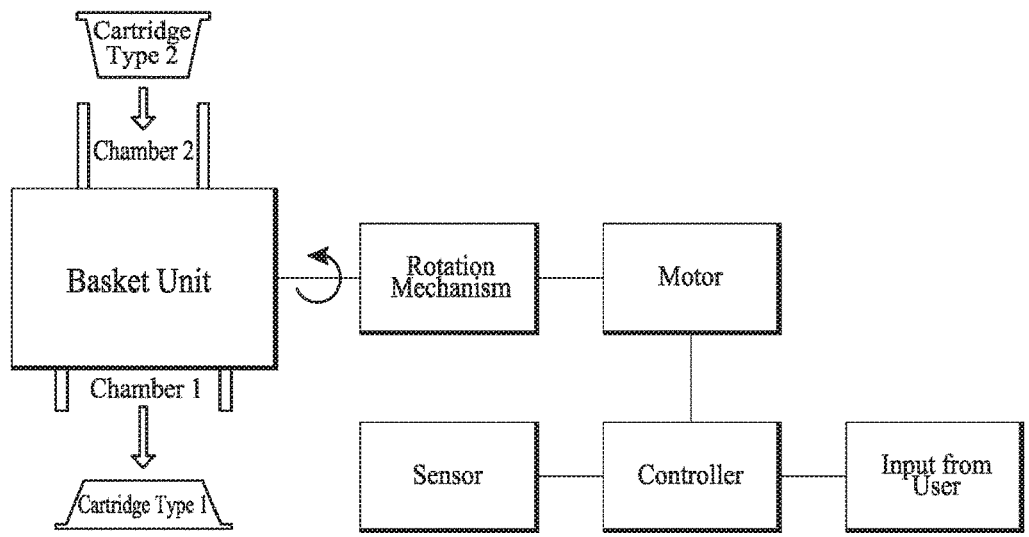

Further schematic embodiments of certain embodiments of the beverage production assembly 400 are illustrated in FIGS. 4B and 4C. In a mode, the basket unit 500 can be positioned to receive a first cartridge type into a first chamber. The basket unit 500 can be moved (e.g., rotated) by a mechanism coupled with a motor. This can put the basket unit 500 into another mode, such as the basket unit 500 being positioned to receive a second cartridge type into a second chamber and/or being positioned to eject the first cartridge type from the first chamber. In some implementations, the basket unit 500 can be further moved (e.g., rotated), such as to return the basket unit 500 to the position to receive the first cartridge type into the first chamber and/or to eject the second cartridge type from the second chamber. As indicated above, the rotation of the basket unit 500 can be controlled by a controller, which can receive a signal from one or more sensors. In some embodiments, the signal indicates the position of the basket unit 500 (e.g., whether the first chamber or the second chamber is positioned to receive a cartridge). In certain embodiments, the controller is configured to receive an input from a user, such as the type of beverage the user desires to have produced and/or the type of cartridge the user desires to position in the basket unit (e.g., the first type or the second type).

Figure 5:
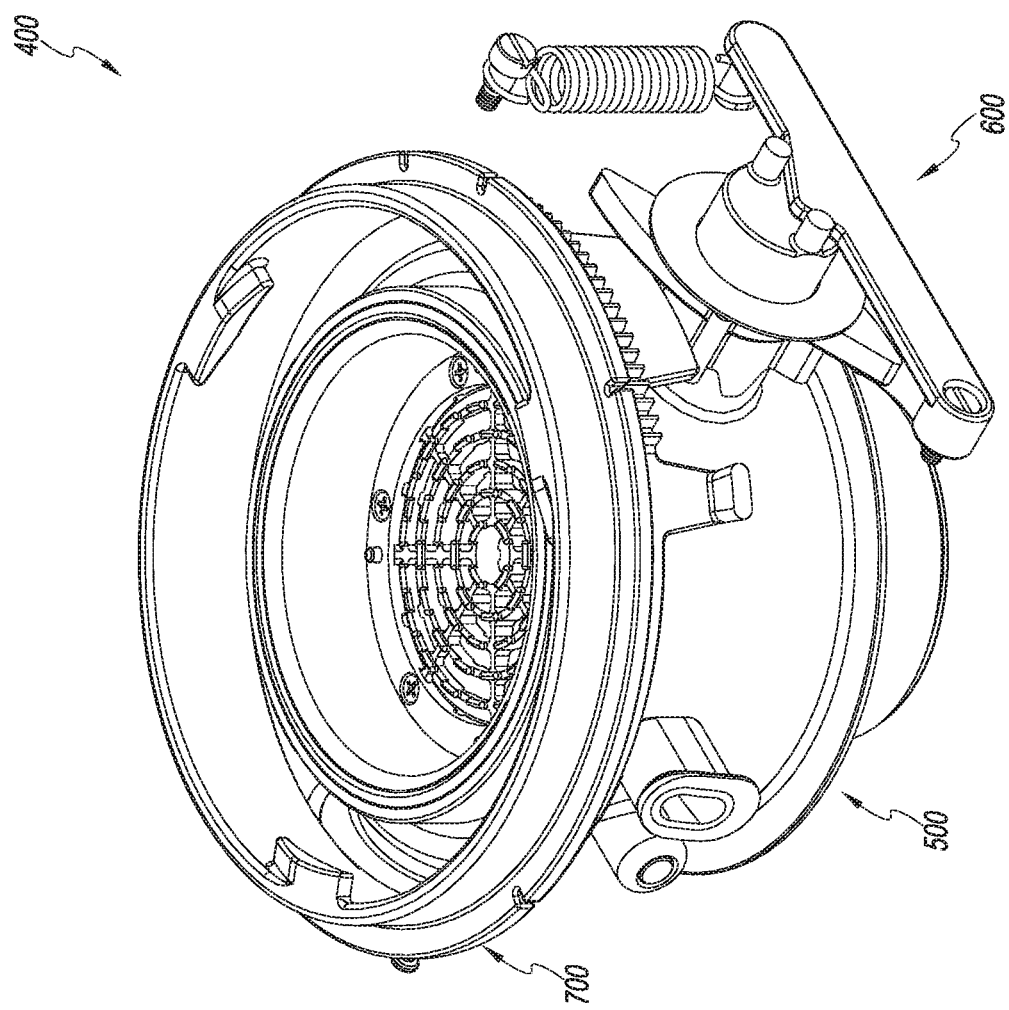
FIG. 5 illustrates a perspective view of the beverage production assembly of FIG. 3 with the frame hidden and the cartridge removed.

An embodiment of the beverage production assembly 400 is illustrated in FIG. 5. As noted above, the beverage production assembly 400 can include the basket unit 500. The beverage production assembly 400 can also include a ratchet assembly 600 and/or a collar 700. In some embodiments, engagement between the ratchet assembly 600 and the collar 700 can facilitate movement (e.g., rotation) of the basket unit 500. This can allow the basket unit 500 to be selectively positioned to provide access to a desired chamber in the basket unit, such as for loading a cartridge. Additional details regarding the beverage production assembly, as well as associated functions, are disclosed in U.S. Application Publication No. 2015/0257580, filed Mar. 11, 2014, and U.S. Application Publication No. 2015/0257585, filed Mar. 11, 2014, the entirety of each of which is hereby incorporated by reference.

Beverage Cartridge

Figure 6A:
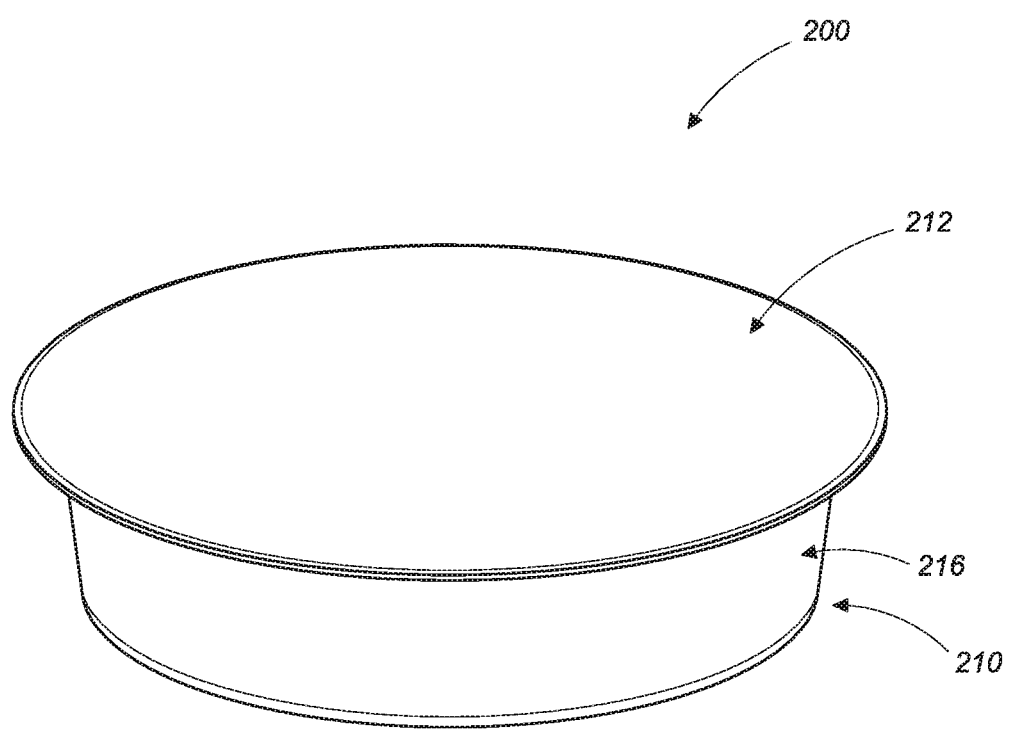
FIG. 6A illustrates a perspective view of a single-serve beverage cartridge.
Figure 6B:
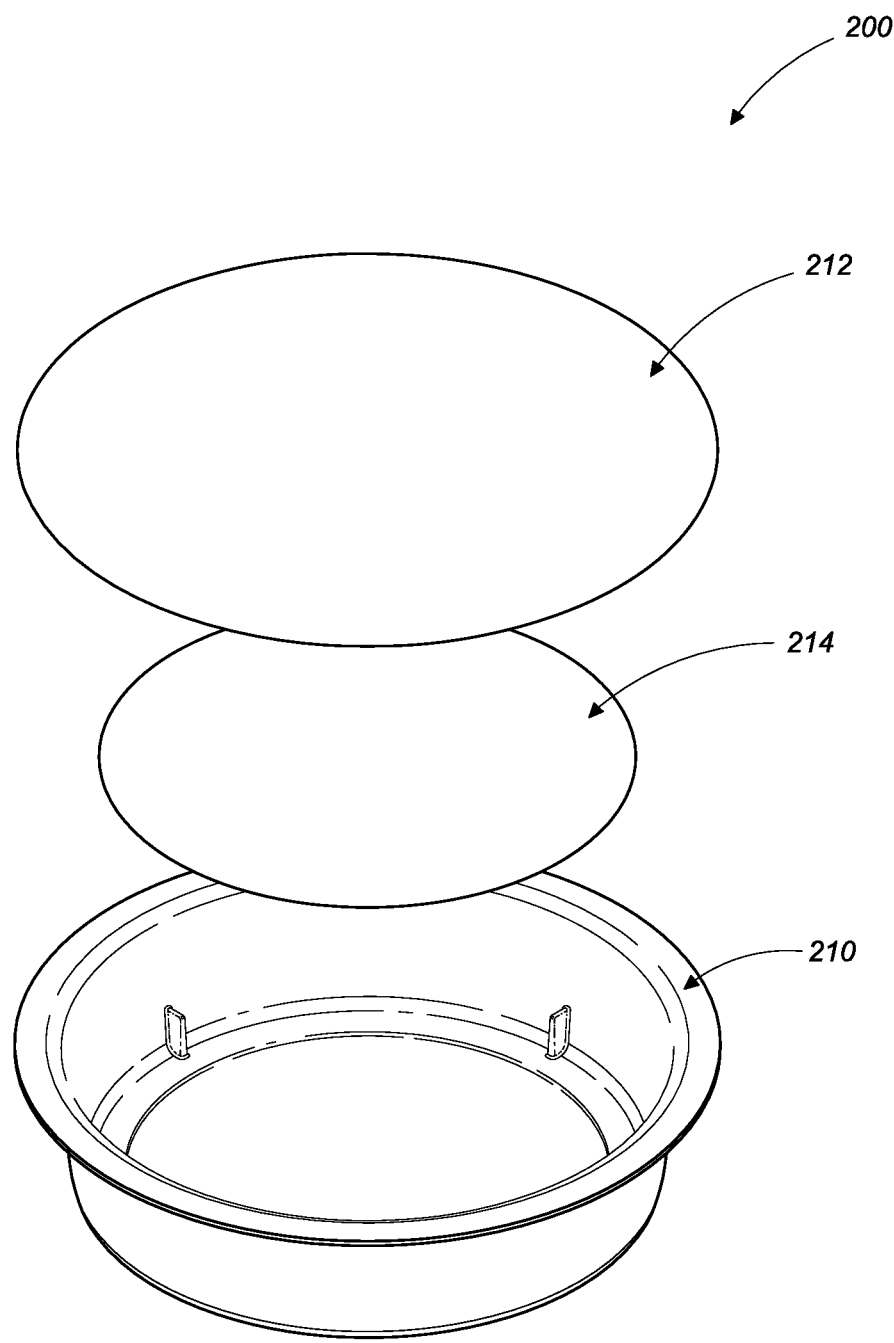
FIG. 6B illustrates an exploded view of certain components of the cartridge of FIG. 5A.
Figure 6C:
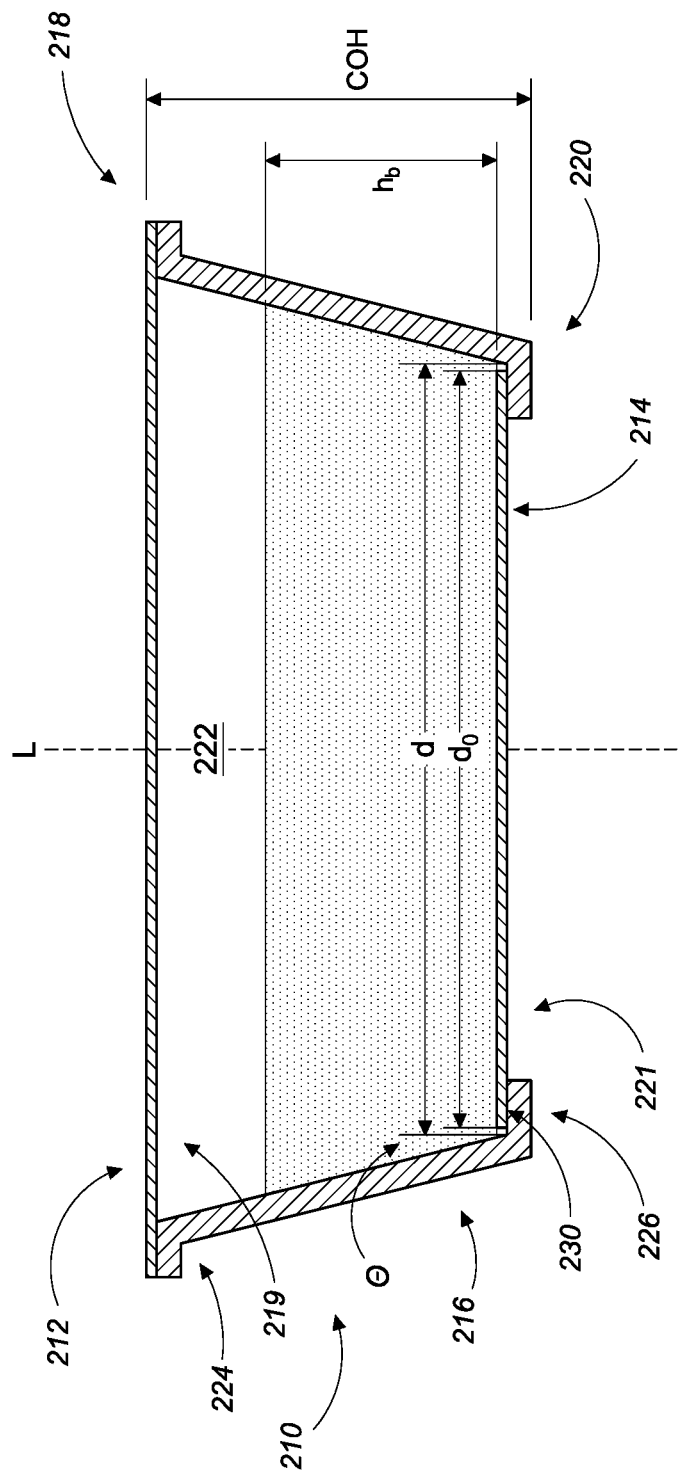
FIG. 6C illustrates a side cross-sectional view of the cartridge of FIG. 5A, including a beverage component or precursor.

FIGS. 6A-6C show an illustrative embodiment of the single-serve beverage cartridge 200. According to some embodiments, the cartridge 200 includes a body portion 210, a first filter element 212, and a second filter element 214. The body portion 210 can be a generally hollow structure having a sidewall 216, a first end 218, and a second end 220. The first end 218 can include a first aperture 219 and the second end 220 can include a second aperture 221. In some embodiments, the first end 218 is coupled with (e.g., generally covered or closed by) the first filter element 212 and the second end 220 is coupled with the second filter element 214. The body portion 210, first filter element 212, and second filter element 214 can thus define a generally closed chamber 222 in the cartridge 200. In various embodiments, the chamber 222 can include a beverage component or precursor, as discussed in more detail below. As shown in FIG. 6C, the cartridge 200 can have an axial axis L. In some embodiments, the axial axis L extends between radial center points of the first and second ends 218, 220 and/or of the first and second filter elements 212, 214.

Certain embodiments of the body portion 210 have a first filter engagement member 224, such as a radially-outwardly extending shoulder or lip or flange, located at or near the first end 218. Some embodiments have a second filter engagement member 226, such as a radially-inwardly extending shoulder or lip or flange, located at or near the second end. In certain implementations, the first filter engagement member 224 is configured to join with the first filter element 212, such as by adhesive, compression (e.g., pinching, crimping, or the like), UV-curing, thermal or sonic welding, or otherwise. The second filter engagement member 226 can be configured to join with the second filter element 214. In some implementations, the second filter member 214 is configured to join with the sidewall 216. In some variants, at least one of the first and second filter elements 212, 214 are joined with the body portion 210 during a forming operation, such as during a molding operation. In some variants, at least one of the first and second filter elements 212, 214 are joined with the body portion 210 by welding, such as ultrasonic or thermal welding. Certain implementations of the first and/or second filter engagement members 224, 226 have a rounded (e.g., rolled) edge.

In some embodiments, at least one of the first and second filter elements 212, 214 is joined with an outer surface (e.g., directed outwardly from the chamber 222) of the body portion 210. For example, the first filter element 212 can be joined with an outer surface 228 of the first filter engagement member 224 of the body portion 210. According to certain implementations, at least one of the first and second filter elements 212, 214 is joined with an inside surface (e.g., directed inwardly toward the chamber 222) of the body portion 210. For example, the second filter element 214 can be joined with an inside surface 230 of the second filter engagement member 226 of the body portion 210.

As illustrated, the body 210 can have a gradually tapered and generally cylindrical shape. For example, the sidewall 216 can be angled at a draft angle Θ, such as at least about: 3°, 5°, 7°, 9°, 11°, 13°, 15°, values between the aforementioned values, or other values. Of course, other shapes can be used without departing from the spirit and/or scope of the disclosure.

As also illustrated, in some embodiments, the first and/or second filters 212, 214 have a generally circular shape. For example, the second filter 214 can have a filter diameter $d_0$, which is measured at the outside diameter of the second filter 214. The second filter 214 has an area A that faces the inside of the cartridge 200 and/or that contacts the beverage component or precursor. The area A can be calculated with the equation $A = d_0^2 \pi / 4$.

As previously mentioned, the cartridge 200 can contain a volume (e.g., a single serving or single-serve portion) of a beverage component or precursor. The beverage component or precursor can be most any substance that produces a beverage by mixing the component or precursor with a liquid, such as water or milk. For example, the cartridge 200 can contain coffee grounds, instant coffee, microground coffee, leaves or herbs or other organic material (e.g., for making tea), fruit juice concentrate, soft drink syrup, or otherwise. The term "instant" as used herein shall be given its ordinary and customary meaning, and shall include, without limitation, products that readily dissolve or disperse in a liquid, such as water or milk. In some implementations, the beverage component or precursor comprises coffee grounds (e.g., for brewed coffee) with a median grind size of between about 400 microns and about 900 microns, about 500 microns and about 850 microns, about 700 microns and about 800 microns, or otherwise. In some implementations, the beverage component or precursor comprises coffee grounds (e.g., for espresso) with a median grind size of between about 25 microns and about 500 microns, about 35 microns and about 200 microns, about 40 microns and about 70 microns, or otherwise. Certain embodiments include coffee grounds with a median grind of less than or equal to about 390 microns. In some embodiments, the cartridge 200 includes coffee beans, such as roasted whole coffee beans. In some embodiments, the coffee beans are ground in the cartridge 200 to form the beverage component or precursor, such as by engaging a grinding head (e.g., a blade, rotating compression element, or otherwise) with the cartridge 200. Further details regarding certain cartridges configured to grind whole coffee beans can be found in U.S. application Ser. No. 14/941,165, filed Nov. 13, 2015, the entirety of which is hereby incorporated by reference.

As shown, the beverage component or precursor extends a height above the top of the second filter 214 and/or the top of the second filter engagement member 226, such as a radially-inwardly extending shoulder or lip or flange. This height, which is measured parallel with the axis L, is called the "bed depth" $h_b$ (or the "effective bed depth"). The bed depth $h_b$ is typically a function of the geometry and size of the cartridge 200 and the volume $V_c$ of the beverage component or precursor that is in the cartridge 200. The volume $V_c$ can be calculated with the equation $V_c = m/\rho$, where m is the mass of the beverage component or precursor and $\rho$ is the density of the beverage component or precursor. In some embodiments, the density of the beverage component or precursor is a free-fall and/or non-tapped density. In some embodiments, the density of the beverage component or precursor is a tapped density (e.g., compressed manually or with a machine).

In certain implementations, the bed depth $h_b$ is determined from the volume formula of a frustum of a cone or pyramid, and/or from the formula of the tangent definition (which can be used as a substitution). In certain embodiments, the bed depth $h_b$ can be determined with the equation:

$$h_b = \left(\left(\frac{d^3}{8}\tan\Theta^3\right) + \left(\frac{3V_c}{\pi}\tan\Theta^2\right)\right)^{1/3} - \frac{d}{2}\tan\Theta$$

Where Θ is the draft angle and d is the lower inside diameter of the cartridge 200, as shown in FIG. 6C. In certain embodiments, d is approximately equal to the filter diameter $d_0$. For example, the ratio of $d_0$ to d can be at least about: 0.85, 0.90, 0.95, 0.99, values between the aforementioned values, or other values.

Certain embodiments of the cartridge 200 are configured such that the bed depth $h_b$ and the area of the second filter area A satisfy a ratio $h_b/A$, which is called the "bed depth to filter area ratio." Additionally, because the ratio of bed depth $h_b$ to the area of the second filter A can indicate how spread-out the beverage component or precursor is within the cartridge 500, the ratio $h_b/A$ can also be called the "spread ratio." In some embodiments, the spread ratio of is at least about: 0.10, 0.15, 0.20, 0.25, 0.30, 0.35, 0.40, 0.50, values between the aforementioned values, or other values.

The spread ratio can affect the pressure needed to encourage liquid through the cartridge 200, such as typically occurs during the brewing of a beverage. For example, in some variants, as the ratio increases (e.g., as the bed depth increases and/or the filter area decreases), the brew pressure increases. Likewise, as the ratio decreases (e.g., as the bed depth decreases and/or the filter area increases), the brew pressure decreases. In some implementations, the relationship between bed depth $h_b$ and filter area A is linear. In certain implementations, this relationship is non-linear, such as being a quadratic relationship, exponential relationship, or otherwise.

The cartridge overall height (COH) is typically greater than the bed depth $h_b$. For example, certain implementations have a ratio of bed depth $h_b$ to cartridge overall height COH that is less than or equal to about: 0.50, 0.75, 0.80, 0.90, 0.95, 0.99, values between the aforementioned values, or other values.

Additional details regarding the beverage cartridge, as well as associated functions, are disclosed in U.S. Application Publication No. 2014/0272018, filed Feb. 26, 2014, the entirety of which is hereby incorporated by reference.

Regulating Pressure in the Cartridge

Limiting the brew pressure in the cartridge 200 during brewing can beneficially affect the taste of the beverage produced. For example, it has been found that a brew pressure of less than or equal to about 6 psi yields superior tasting brewed coffee. It has been found that a brew pressure of above about 6 psi begins to shift the flavor profile toward an "Americano" flavor profile, which may be characteristic of high pressure extracted coffee from espresso plus hot water. Generally, in an "Americano" flavor profile, more of the "roast" or "impact" is expressed in the beverage, rather than certain aromas and/or flavor markers (e.g., lemon, cocoa, butter, etc.), which tend to be muted and not readily perceived. In contrast, in a so-called "drip brewed" flavor profile, the flavor profile typically possesses clearly perceivable aroma and/or flavor markers of the particular coffee type and/or blend (e.g., medium roast coffee, such as Pike Place® Roast). Thus, in certain embodiments, it can be desirable for the machine 100 and/or the cartridge 200 to be configured such that the brew pressure is less than a pressure limit value, such as less than or equal to about: 6 psi, 5 psi, 4 psi, 3 psi, 2 psi, values between the aforementioned values, or other values. To provide such configurations, some embodiments of the cartridge 200 satisfy certain relationships between the spread ratio, a head loss coefficient, and/or a pressure drop limit, as is discussed in more detail below. In various embodiments, the relationship can facilitate the determination of additional preferable configurations of the cartridge 200. As described in more detail below, this disclosure describes determining, for each of a plurality of cartridges, a head loss coefficient for the particular cartridge (e.g., by empirically testing the cartridge in a test brewing apparatus). The disclosure also describes determining a spread ratio for each of the particular cartridges. The disclosure further describes relating the head loss coefficient with the respective spread ratio, such as by plotting the head loss coefficients and their respective spread ratio on a graph. Some embodiments include describing this relationship with a trendline. Some embodiments include using the relationship and to aid in determining additional (e.g., theoretical) cartridges that will comply with the relationship. Some embodiments using the relationship to aid in determining additional (e.g., theoretical) cartridges that will comply with a pressure constraint.

Determining the Head Loss Coefficient

Figure 7A:
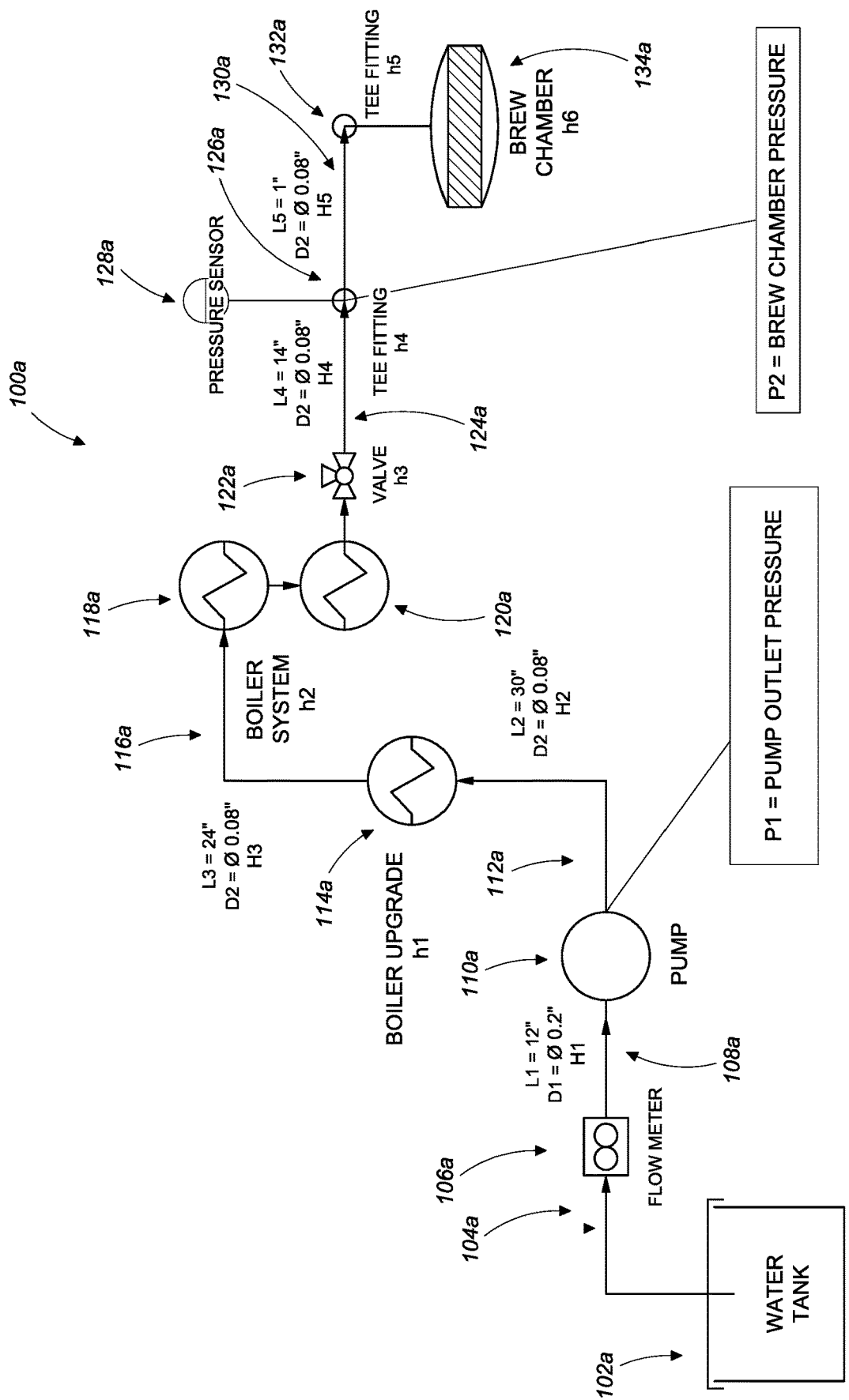
FIG. 7A illustrates a schematic flow diagram of an embodiment of the beverage production machine of FIG. 1 in operation.

FIG. 7A schematically depicts a brew apparatus 100a, which is illustrative of certain embodiments of the machine 100 discussed above in connection with FIG. 1. As shown, the brew apparatus 100a includes a liquid tank 102a, which can hold brewing liquid, such as water or milk. Piping 104a connects the tank 102a to a flow meter 106a, which in turn connects by piping 108a to a pump 110a. The pump 110a is connected via piping 112a to a boiler system. In some embodiments, the boiler system includes a first boiler portion 114a, which is connected by piping 116a to second and third boiler portions 118a, 120a. In the example illustrated, the third boiler portion 120a is connected to a three-way valve 122a, which is connected to piping 124a, which in turn is connected to a tee fitting 126a. As shown, the tee fitting 126a is connected to both a pressure sensor 128a and to piping 130a. The piping 130a connects to another tee fitting 132a, which connects to a brew chamber 134a.

The total energy at two different points in a hydraulic system can be summarized as an energy balance that relates the pressure energy, kinetic energy, and potential energy of the fluid at the two points, less losses. The energy balance can be expressed as the equation from Bernoulli:

$$p_1 + \tfrac{1}{2}\rho v_1^2 + \rho g z_1 = p_2 + \tfrac{1}{2}\rho v_2^2 + \rho g z_2 + p_{loss}$$

Where:
$p_1$, $p_2$=the pressure in fluid at point 1 and point 2, respectively;
$\rho$=the density of the fluid;
$v_1$, $v_2$=the flow velocity at point 1 and point 2, respectively;
$g$=the acceleration of gravity;
$z_1$, $z_2$=the elevation above a baseline at point 1 and point 2, respectively; and
$p_{loss}$=the pressure loss.

The pressure loss component can be divided into major losses (e.g., losses associated with friction in the piping) and minor losses (e.g., losses associated with fittings, valves, bends, and other features in the piping). Moreover, each portion of piping can be associated with a certain amount of major loss (indicated as "Hx" on FIG. 7A, where the "x" is a unique number for each piping portion) Likewise, each fitting, valve, bend, and other features in the system can be associated with a certain amount of minor loss (indicated as "hx" on FIG. 7A, where the "x" is a unique number for each fitting, valve, bend, and other feature).

Major losses $H_x$ for a feature "x" can be determined with the equation H=f(L/D)vH, where f is the Moody friction factor, L is the line length of feature x, D is the internal diameter of feature x, and vH is the velocity head through feature x. That is, the major loss equation can be described as the Moody friction factor divided by the ratio of the line length to internal line diameter times the velocity head. The Moody friction factor can be determined with various equations, such with as the Swamee-Jain equation:

$$f = \frac{0.25}{\left( \log\left( \frac{\varepsilon}{\frac{D}{3.7}} + \frac{5.74}{Re^{0.9}} \right) \right)^2}$$

Where:
f=the Moody friction factor;

ε=the roughness height;
D=the diameter of the piping; and
Re=the Reynolds number for the fluid flow.

The minor losses for a feature "x" in the piping can be determined with the equation:

$$h_x = k_x vH_x$$

Where:
h=the minor head loss of feature x; and
k=the head loss coefficient of feature x; and
$vH_x$=the velocity head through feature x.

As shown in FIG. 7A, a pressure sensor 128a is positioned at the fitting 126a. Thus, the pressure at this point in the system can be known from measurements. Moreover, because the brew chamber 134a expels the brewed beverage at atmospheric pressure, the pressure at that point is also known. Thus, from the pressure sensor 128a to the exit of the cartridge 200, the pressure balance equation can be expressed as:

$$p_2 = g\rho \left( H_5 + h_5 + h_6 - z_2 + z_{atm} - vH_6 + \frac{p_{atm}}{g\rho} \right)$$

Where:
$p_2$, $p_{atm}$=the absolute pressure at the pressure sensor and the atmospheric pressure, respectively;
g=the acceleration of gravity;
ρ=the density of the brew liquid;
$H_5$=the major head loss of the piping;
$h_5$=the minor head loss of the tee fitting;
$h_6$=the minor head loss of the brew chamber;
$z_2$, $z_{atm}$=head height factors (e.g., $z_{atm}$ can be the height at which the beverage is dispensed); and
$vH_6$=the velocity head at the cartridge 200.

As noted above, the minor losses for a feature in the piping are equal to the loss coefficient, multiplied by the flow velocity head ($h_x=k_x vH_x$). For example, in the embodiment shown in FIG. 7A, the minor head loss at the brew chamber is $h_6=k_6 vH_6$. Thus, the pressure balance equation above can be solved for the minor head loss coefficient $k_6$:

$$k_6 = -\frac{H_5 + h_5 - vH - z_2 + z_{atm} - \frac{p_2 - p_{atm}}{g\rho}}{vH}$$

The velocity head vH can be determined from the amount of time that beverage preparation liquid is passed through the cartridge 200 (which can be called the "brew time"), the inside diameter of the piping that connects to the inlet of the cartridge 200 (e.g., inside diameter of the piping 130a in FIG. 7A), and the final beverage volume. For example, the brew time divided by the final beverage volume is the mass flow rate (Q=t/V), which can be divided by the cross sectional interior area of the piping 130a to determine the fluid velocity ($v=4Q/(\pi D^2)$). The fluid velocity squared divided by two times the acceleration of gravity is the velocity head ($vH=v^2/2g$). Thus, the pressure balance equation above can be written:

$$k_6 = -\frac{H_5 + h_5 - \frac{v^2}{2g} - z_2 + z_{atm} - \frac{p_2 - p_{atm}}{g\rho}}{\frac{v^2}{2g}}$$

Accordingly, the minor head loss coefficient k for a cartridge is a function of head losses, fluid velocity, head height factors, fluid density, fluid temperature, fluid viscosity and pressure. The pressure ($p_2$) at a point in a brewing apparatus can be measured, such as with a pressure sensor. In the fluid flow path between the sensor and a brew chamber, the various components of the apparatus (e.g., piping, tees, etc.) create major and minor head losses (e.g., $H_5$ and $h_5$), which can be determined from the attributes of the components (e.g., piping lengths, piping diameters, etc.) and known engineering equations. The head height factors of the fluid ($z_2$ and $z_{atm}$) can be determined from the height difference between the surface of the water tank to the system exit (cartridge discharge). Further, the atmospheric pressure, acceleration of gravity, and mass density of the brew liquid (e.g., water) are typically known. Many of these features (e.g., $H_5$, $h_5$, $z_2$ $z_{atm}$, and $p_{atm}$) remain generally constant regardless of the attributes of the cartridge. On the other hand, the pressure $p_2$ and fluid velocity v typically change based on the attributes of the cartridge. As discussed above, the pressure $p_2$ can be measured and the fluid velocity can be determined from the brew time, fluid entrance diameter of the cartridge, and the final beverage volume. Therefore, with knowledge of the pressure $p_2$, brew time, fluid entrance diameter of the cartridge, and final beverage volume, the head loss coefficient k of the cartridge can be determined.

Relating the Head Loss Coefficient and Spread Ratio

It can be desirable to relate the head loss coefficient of the cartridge and/or brew chamber to the spread ratio of the cartridge 200. This can aid in determining a configuration for the cartridge 200 that complies with certain pressure characteristics. For example, relating the head loss coefficient of the cartridge and/or brew chamber to the spread ratio can aid in determining aspects of the cartridge 200 (e.g., the filter diameter $d_0$, the draft angle Θ, the bed depth $h_b$ of the beverage component or precursor, and/or the volume of the beverage component or precursor) such that the brew pressure in the cartridge 200 is less than or equal to a pressure limit value such as about 6 psi. In various embodiments, the cartridge 200 can be configured to have a spread ratio that correlates with a reduced head loss coefficient, which can reduce and/or control the pressure needed to encourage liquid through the cartridge 200.

As an example, discussed below is an illustrative procedure that relates to the head loss coefficient of the brew chamber to the spread ratio. The procedure included a pressure testing stage, a cartridge head loss coefficient determination stage, and a relationship determination stage. The procedure included an apparatus as shown in FIG. 7A, coffee at about a 790 micron grind, filtered water, and a slate of cartridges comprising: one 8 fluid-ounce cartridge with an upper opening diameter of about 2.35 inches, ten 12 fluid-ounce cartridges with an upper opening diameter of about 2.35 inches, and one 12 fluid-ounce cartridge with an upper opening diameter of about 2.50 inches.

In the pressure testing stage, about 14 grams of the ground coffee were added to the 8 fluid-ounce cartridge. The cartridge was placed in the brew chamber of the apparatus 100a. The apparatus 100a was used to pass water through the cartridge for a period of about 90 seconds, during which the pressure sensor 128a detected the pressure at about 1 second intervals. A similar process was repeated for the ten 12 fluid-ounce cartridges with an upper opening diameter of about 2.35 inches (three of the cartridges included about 18 grams of the ground coffee, three included about 19 grams of the ground coffee, three included about 20 grams of the ground coffee, and one included about 21 grams of the ground coffee). Likewise, the process was repeated for the 12 fluid-ounce cartridge with an upper opening diameter of about 2.50 inches, which included about 21 grams of the ground coffee. The data from these processes is summarized below in Table A.

variants, the coefficient of determination is at least about: 0.70, 0.75, 0.80, 0.85, 0.90, 0.95, 0.98, 0.99, values between the aforementioned values, or other values.

More generally, the relationship between the loss coefficient and the spread ratio can be expressed as:

TABLE A

| | | | | | | | | | | | | |
|---|---|---|---|---|---|---|---|---|---|---|---|---|
| Set Point Volume (fl-oz) | 8 | 11.9 | 11.8 | 11.7 | 11.8 | 11.4 | 11.8 | 11.7 | 11.4 | 11.9 | 12.0 | 12.0 |
| Upper Flange Diameter (in) | 2.74 | 2.74 | 2.74 | 2.74 | 2.74 | 2.74 | 2.74 | 2.74 | 2.74 | 2.74 | 2.74 | 2.89 |
| Pod Upper Internal Diameter (in) | 2.35 | 2.35 | 2.35 | 2.35 | 2.35 | 2.35 | 2.35 | 2.35 | 2.35 | 2.35 | 2.35 | 2.50 |
| Pod Draft Angle (deg.) | 9 | 9 | 9 | 9 | 9 | 9 | 9 | 9 | 9 | 9 | 9 | 9 |
| tan (draft angle) | 0.16 | 0.16 | 0.16 | 0.16 | 0.16 | 0.16 | 0.16 | 0.16 | 0.16 | 0.16 | 0.16 | 0.16 |
| Coffee: Yield Ratio (g/fl-oz) | 1.75 | 1.52 | 1.52 | 1.54 | 1.61 | 1.66 | 1.61 | 1.71 | 1.76 | 1.69 | 1.6 | 1.6 |
| Dose (g) | 14 | 18 | 18 | 18 | 19 | 19 | 19 | 20 | 20 | 20 | 21 | 21 |
| Pod Effective Bed Depth (in) | 0.59 | 0.81 | 0.81 | 0.81 | 0.86 | 0.86 | 0.86 | 0.90 | 0.90 | 0.90 | 0.94 | 0.94 |
| Pod Lower ID (in) | 2.16 | 2.05 | 2.05 | 2.05 | 2.05 | 2.05 | 2.05 | 2.05 | 2.05 | 2.05 | 2.05 | 2.05 |
| Pod Bottom Filter Diameter (in) | 1.81 | 1.81 | 1.81 | 1.81 | 1.81 | 1.81 | 1.81 | 1.81 | 1.81 | 1.81 | 1.81 | 1.97 |
| Pod Bottom Filter Area (in$^2$) | 2.57 | 2.57 | 2.57 | 2.57 | 2.57 | 2.57 | 2.57 | 2.57 | 2.57 | 2.57 | 2.57 | 3.05 |
| Bed Depth: Area Ratio (in/in$^2$) | 0.23 | 0.32 | 0.32 | 0.32 | 0.33 | 0.33 | 0.33 | 0.35 | 0.35 | 0.35 | 0.37 | 0.31 |
| Calculated Head Loss Coeff. (k) | 20.3 | 38.3 | 35 | 34.7 | 40 | 39.8 | 39.2 | 41.4 | 41.7 | 42.3 | 47 | 36 |
| Required Calculated Pod Volume (in$^3$) | 2.37 | 3.05 | 3.05 | 3.05 | 3.22 | 3.22 | 3.22 | 3.39 | 3.39 | 3.39 | 3.6 | 3.6 |
| Brew Time (s) | 70 | 93.4 | 88.5 | 87.5 | 90 | 88 | 88 | 88.5 | 89.5 | 90 | 90 | 90 |
| Measured Pressure Drop (psi) | 1.80 | 4.27 | 4.27 | 4.26 | 4.74 | 4.59 | 4.86 | 5.00 | 4.66 | 5.11 | 5.80 | 4.40 |
| Expected Brew Pod Pressure Drop (psi) | 1.5 | 3.6 | 3.7 | 3.6 | 4.0 | 3.9 | 4.1 | 4.2 | 3.9 | 4.3 | 4.9 | 3.8 |

In the cartridge head loss coefficient determination stage, the energy balance equation above was used to determine the minor head loss coefficient of the brew chamber with each of the aforementioned cartridges inserted, one at a time. This includes a spray head, the inserted respective cartridge, and the exit geometry to the point of dispensation. However, because (aside from the cartridge) the brew chamber characteristics remained constant across these tests, the differences in the minor head loss coefficient found could be attributed to the differences in the characteristics of the tested cartridge. An example of such a determination of minor loss coefficient, for the cartridge with an upper opening diameter of about 2.50 inches, is shown in FIG. 7B.

Figure 8:
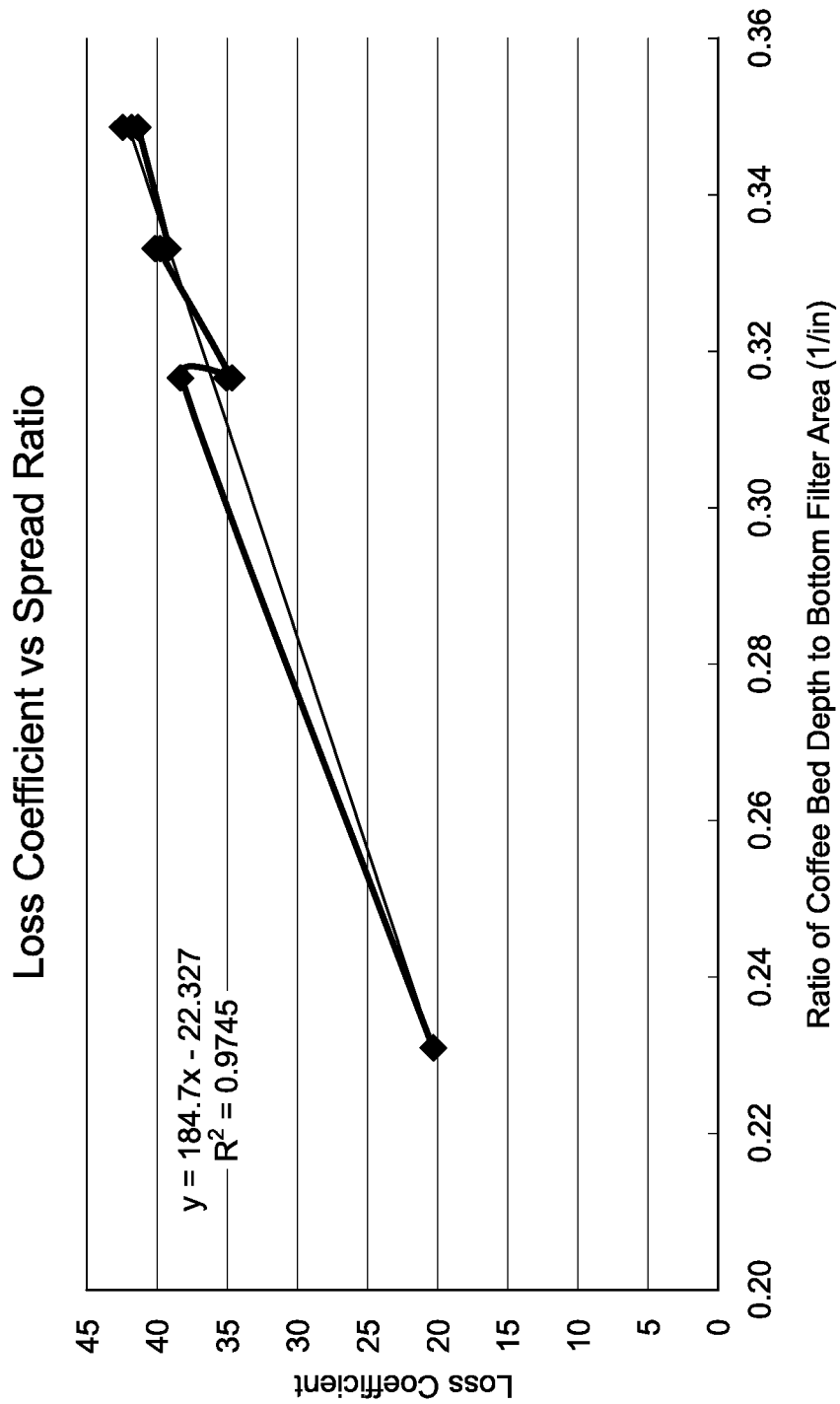
FIG. 8 illustrates a chart showing an example relationship of a head loss coefficient to spread ratio.

In the relationship determination stage, the determined loss coefficients were plotted based on their associated spread ratios, as is shown in FIG. 8. A linear trendline (e.g., linear regression) was generated to approximately describe the relationship between the loss coefficient and the spread ratio. In this example, the relationship was described by the equation:

$$k = 184.7 \frac{h_b}{A} - 22.3$$

A coefficient of determination ($R^2$) value was determined as well. In this example, the $R^2$ value was above 0.97, which can indicate that the trendline strongly fit the data. In some $$k = C_1 \frac{h_b}{A} - C_2$$

Where $C_1$ and $C_2$ are each unitless values that are based on the specifics of a particular embodiment of the cartridge 200. For example, $C_1$ and $C_2$ can vary based on the type and/or grind of the beverage precursor or component contained in the cartridge 200. The $C_1$ and $C_2$ values of 184.7 and 22.3, respectively, can be for medium roast (e.g., Pike Place® Roast) ground coffee with an average grind size of about 790 microns.

Additional $C_1$ and $C_2$ values can be determined for other types and/or grinds of beverage precursor or component. In some embodiments, $C_1$ is at least about 150 and/or less than or equal to about 220, such as between about 175 and about 195, between about 180 and about 190, or otherwise. In certain variants, $C_1$ is at least about: 155, 165, 175, 185, 195, 205, 215, values between the aforementioned values, or other values. In some embodiments, $C_2$ is at least about 10 and/or less than or equal to about 35, such as between about 17 and about 27, between about 20 and about 24, or otherwise. In certain variants, $C_2$ is at least about: 14, 16, 18, 20, 22, 24, 26, 28, values between the aforementioned values, or other values.

Figure 9:
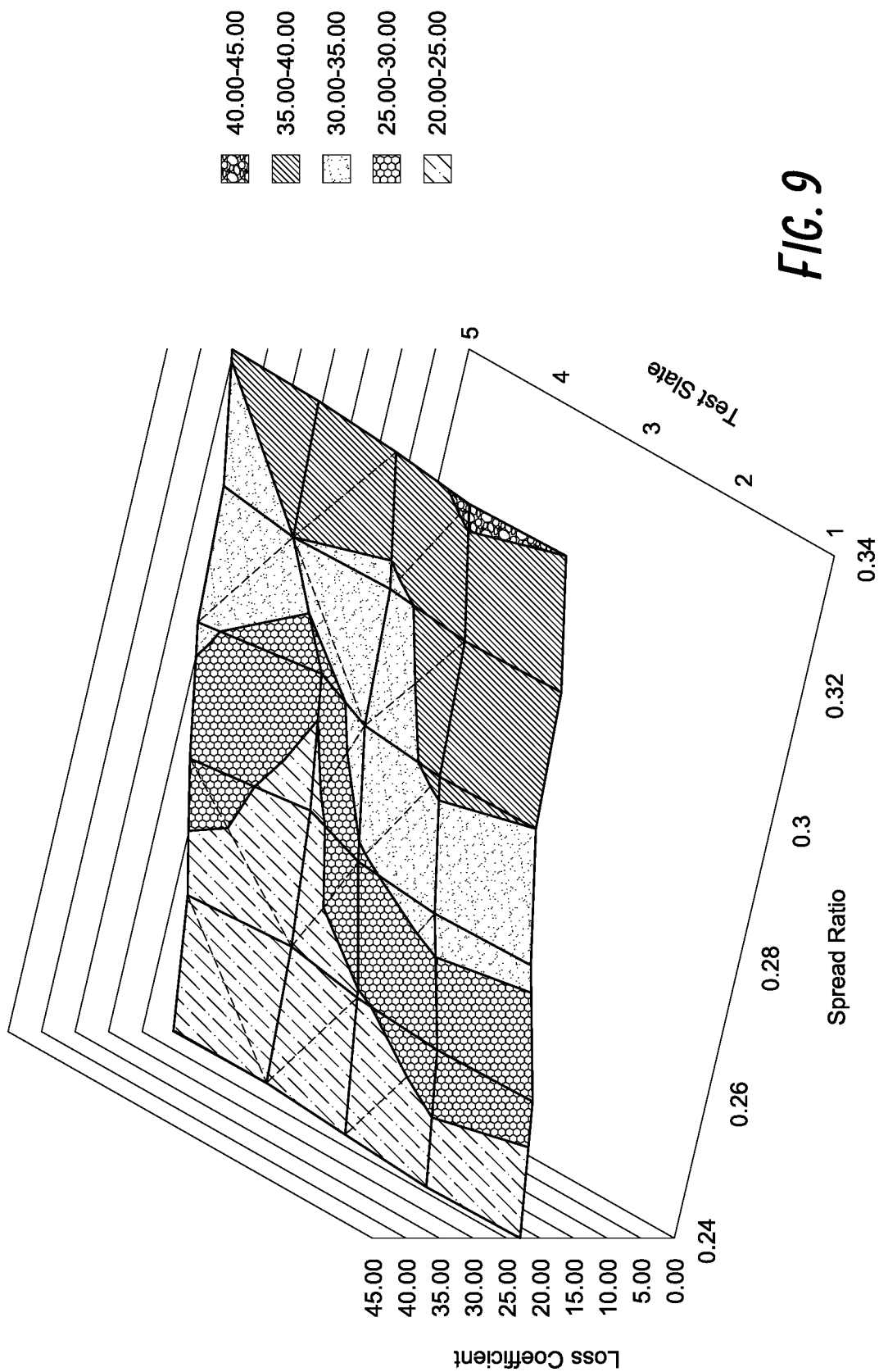
FIG. 9 illustrates a chart showing an example surface model that relates head loss coefficient to spread ratio.

Additional slates of cartridges can be tested as well. For example, additional slates of cartridges can be analyzed and tested as described above. In certain test regimens, the physical characteristics of the cartridges (e.g., cartridge volume, upper opening diameter, filter type, etc.) change from slate to slate and other aspects of the testing are unchanged. For example, the type and/or grind of the beverage precursor can be constant across the slates. In some testing regimens the physical characteristics of the cartridges (e.g., cartridge volume, upper opening diameter, filter type, etc.) are unchanged and from slate to slate and other aspects of the testing are changed (e.g., the type and/or grind of the beverage precursor). For each slate, a relationship (e.g., a linear regression) and $C_1$ and $C_2$ values can be determined. For example, a linear regression can be determined for each particular type and/or grind of the beverage precursor or component tested in the slates. The various relationships can be aggregated into a surface model, such as is shown in FIG. 9 (which includes five slates). The surface model can be used to determine additional cartridge 200 configurations (e.g., for a particular type and/or grind of the beverage precursor or component) that will comply with one or more of the relationships. This can allow additional cartridge configurations to be determined that will comply with a constraint, such as a pressure limit (e.g., a 6 psi limit).

The cartridge 200 can be configured to comply with a desired spread ratio $h_b/A$. As noted above, the area A can be determined from the equation: $A=d_0^2\pi/4$, and the bed depth $h_b$ can be determined from the equation (which, as noted above, can be frustum of a cone volume equation):

$$h_b = \left(\left(\frac{d^3}{8}\tan\Theta^3\right) + \left(\frac{3V_c}{\pi}\tan\Theta^2\right)\right)^{1/3} - \frac{d}{2}\tan\Theta$$

The filter diameter $d_0$, the lower inside diameter d, the draft angle $\Theta$, and/or the volume $V_c$ of the beverage component or precursor can be configured such that the cartridge 200 satisfies the desired spread ratio. As an example, if a spread ratio of about 0.35 is determined desirable (e.g., from a model and/or trendline that can approximate and/or predict a relationship between a spread ratio and loss coefficient, such as is shown in FIGS. 7 and 8), the cartridge 200 can be configured to include a filter diameter $d_0$ of about 1.81 inches, a lower inside diameter d of about 2.13 inches, a draft angle $\Theta$ of about 7°, and a volume $V_c$ of the beverage component or precursor of about 21 grams.

In some implementations, a method of configuring a cartridge 200 includes determining a relationship between various spread ratios and loss coefficients, determining a certain spread ratio that satisfies the relationship, and determining features of the cartridge 200 such that the cartridge 200 satisfies the certain spread ratio. In various embodiments, determining features of the cartridge 200 includes determining a filter diameter $d_0$ of a lower filter of the cartridge 200, a lower inside diameter d of the cartridge 200, a draft angle $\Theta$ of the cartridge 200, and/or a volume $V_c$ of the beverage component or precursor in the cartridge 200.

Relating the Head Loss Coefficient, Spread Ratio, and Pressure Drop

The relationship between the head loss coefficient k and the pressure drop across the brew chamber containing an embodiment of the cartridge 200 can be determined from the equation:

$$\Delta p = 8\rho k \frac{V^2}{\pi^2 t^2 D^4}$$

Where:
$\Delta p$=the pressure drop across the brew chamber;
$\rho$=mass density of the brewing liquid;
V=final volume of brewed beverage;
t=brew time; and
D=hydraulic diameter of the port through which the brewing liquid enters the brew chamber.

Additionally, as discussed above, the relationship between the head loss coefficient k and spread ratio $h_b/A$ can be determined, such as with a linear regression trendline. Accordingly, given the equation above relating the head loss coefficient k and the pressure drop $\Delta p$, the relationship between the spread ratio $h_b/A$ and the pressure drop $\Delta p$ can also be determined. For example, in the embodiment discussed above, the relationship between the head loss coefficient k and the spread ratio $h_b/A$ was described by the equation $k=184.7\, h_b/A-22.3$. Thus, the pressure drop $\Delta p$ of such an embodiment can be determined with the equation:

$$\Delta p = 8\rho\left(184.7\frac{h_b}{A} - 22.3\right)\frac{V^2}{\pi^2 t^2 D^4}$$

More generally, the pressure drop $\Delta p$ as a function of spread ratio can be expressed as:

$$\Delta p = 8\rho\left(C_1 \frac{h_b}{A} - C_2\right)\frac{V^2}{\pi^2 t^2 D^4}$$

Accordingly, with knowledge of certain features of the cartridge 200 (e.g., $C_1$ and $C_2$, which can be found from experimentation, as discussed above), the beverage to be produced (e.g., brew liquid density p and final volume V), and the machine 100 (e.g., brew time t and hydraulic diameter D of the entry port), the pressure drop across the brew chamber can be determined and/or controlled as well.

In certain embodiments, the machine 100 and/or cartridge 200 are configured to limit, regulate, or otherwise control the pressure drop $\Delta p$, at which the beverage is brewed. For example, in certain embodiments, one or any combination of the following features are configured to regulate the pressure drop $\Delta p$: the bed depth $h_b$, the filter area A and/or the filter diameter $d_0$, the final volume V of brewed beverage, the brew time t, and the hydraulic diameter D of the entry port (through which the brewing liquid enters the brew chamber). In some embodiments, the bed depth $h_b$, the filter area A and/or the filter diameter $d_0$, the final volume V of brewed beverage, the brew time t, and the hydraulic diameter D of the entry port are sized, shaped, or otherwise configured such that the maximum pressure drop across the brew chamber during preparation of a beverage with the cartridge 200 is less than a pressure limit value, such as less than or equal to: 6 psi, 5 psi, 4 psi, 3 psi, 2 psi, values between the aforementioned values, or other values.

In some embodiments, the cartridge 200 is configured to satisfy a spread ratio, determined by a desired (or required) pressure drop and/or attributes of the machine 100 and the beverage to be produced. For example, the pressure drop equation discussed above can also be solved for the spread ratio:

$$\frac{h_b}{A} = \frac{\Delta p \pi^2 t^2 D^4}{8 C_1 \rho V^2} + C_2$$

The cartridge 200 can be configured to have a spread ratio that is determined from features of the machine 100 and/or the beverage to be produced. For example, certain aspects of the machine 100 and/or the beverage to be produced may be known, such as the mass density p of the brewing liquid, the final volume V of the brewed beverage, the brew time t, and the hydraulic diameter D of the entry port. Further, as discussed above, limiting the pressure to less than or equal to a pressure limit value (e.g., about 6 psi) can provide a coffee beverage with improved taste. Thus, the maximum pressure drop $\Delta p$ desirable or permissible may be known. Additionally, as discussed above, $C_1$ and $C_2$ can be determined, such as empirically. Accordingly, in certain implementations, all of the variables on the right hand side of the equation are known, which allows the spread ratio ($h_b/A$) to be determined for the cartridge 200 to satisfy the needs of the machine 100 and/or beverage while still regulating pressure. In some embodiments, in determining the spread ratio, certain values on the right side of the equation (e.g., the pressure drop $\Delta p$ and/or the brew time t) are at about a maximum value and/or nominal value, which can allow for determination of the maximum and/or nominal spread ratio for the cartridge 200.

In several embodiments, based on the physical characteristics of the cartridge 200 and/or the machine 100, the pressure drop $\Delta p$ across the brew chamber can be limited and/or regulated. As an example, for a particular machine 100 and beverage type, the right side of the equation above may indicate that a spread ratio of less than about 0.30 would maintain a pressure drop $\Delta p$ of less than about 6 psi. In such a case, the filter area A and/or the bed depth $h_b$ (which, as discussed above, can be based on the lower inside diameter d, draft angle $\Theta$, and volume $V_c$ of the beverage component or precursor) of the cartridge 200 can be configured (e.g., sized and shaped) such that the cartridge 200 provides such a spread ratio of less than about 0.30. As a result, when the cartridge 200 is used in the machine 100 to brew a coffee beverage, the pressure drop $\Delta p$ across the brew chamber would be maintained below 6 psi, thereby providing coffee with improved flavor.

As an example, based on the spread ratio to head loss relationship shown in FIG. 8, a cartridge that complied with a pressure limitation of less than 6 psi was determined, the features of which are summarized below in Table B.

TABLE B

| | |
|---|---|
| Set Point Volume (fl-oz) | 12 |
| Upper Flange Diameter (in) | 2.74 |
| Pod Upper Internal Diameter (in) | 2.35 |
| Pod Draft Angle (deg) | 7 |
| Tan (draft angle) | 0.12 |
| Coffee: Yield Ratio (g/fl-oz) | 1.6 |
| Dose (g) | 21 |
| Pod Effective Bed Depth (in) | 0.91 |
| Pod Lower ID (in) | 2.13 |
| Pod Bottom Filter Diameter (in) | 1.81 |
| Pod Bottom Filter Area (in$^2$) | 2.57 |
| Bed Depth: Area (Ratio: in/in$^2$) | 0.35 |
| Calculated Head Loss Coeff. (k) | 45 |
| Required Calculated Pod Volume (in$^3$) | 3.58 |
| Brew time (s) | 90 |
| Expected Pressure Drop (psi) | 4.7 |

In some implementations, a method of configuring a cartridge 200 to comply with pressure limitation includes determining a spread ratio that satisfies the pressure limitation. Such a determination can account for features of the machine in which the cartridge 200 will be used and/or the beverage to be produced, such as the brewing time, hydraulic diameter D of the entry port, mass density p of the brewing liquid, and/or the final volume V of brewed beverage. The determination can be modified by values (e.g., that are determined empirically) that relate the spread ratio and the loss coefficient of other embodiments of the cartridge 200. Some embodiments of the method include configuring the cartridge 200 to comply with the spread ratio. For example, as discussed above, a filter diameter $d_0$ of a lower filter of the cartridge 200, a lower inside diameter d of the cartridge 200, a draft angle $\Theta$ of the cartridge 200, and/or a volume $V_c$ of the beverage component or precursor in the cartridge 200 can be determined such that the cartridge 200 satisfies the spread ratio. Accordingly, the cartridge 200 can be configured to maintain a pressure of less than or equal to about the pressure limitation, thereby providing coffee with improved flavor.

SUMMARY

Various embodiments and examples of beverage devices and methods have been described herein. Although certain embodiments and examples have been described herein with respect to cartridges for producing coffee beverages, the embodiments and examples described herein can be configured to receive cartridges containing other particulate materials or components for producing many other types of beverages, such as a chocolate based product (e.g., hot cocoa), tea, juice, soup, broth, and other beverages. Further, although some embodiments have been disclosed in which liquid is introduced into the cartridge, the introduction of other phases is contemplated. For example, in some embodiments, steam or a combination of steam and liquid water is introduced into the cartridge. Additionally, although certain embodiments have been disclosed that include a single beverage component or precursor, the term "beverage component or precursor" is not limited to only a single component. Rather, the beverage component or precursor can comprise one component (e.g., coffee) or a plurality of components (e.g., coffee and a sweetener). Moreover, even though certain embodiments have been disclosed in connection with a "brew time," this disclosure is not limited to brewed beverages. Rather, "brew time" can refer to the amount of time that liquid is being passed through the cartridge to prepare the beverage, regardless of whether the beverage is a brewed beverage.

As used herein, the term "beverage," in addition to having its ordinary meaning, can include, among other things, any liquid or substantially liquid substance or product having a flowing quality such as juices, coffee beverages, teas, frozen yogurt, beer, wine, cocktails, liqueurs, spirits, cider, soft drinks, flavored water, energy drinks, soups, broths, combinations of the same, or the like. The term "cartridge" as used herein shall be given its ordinary and customary meaning, and includes, among other things, cartridges, capsules, cups, pods, pucks, pads, and the like, whether or not such cartridge is capable of being pierced or otherwise ruptured in order to form an inlet and/or outlet for the cartridge.

Although certain embodiments have been discussed above in connection with the beverage preparation machine 100 and/or the cartridge 200, this disclosure is not limited to only being used with that machine and that cartridge. On the contrary, this disclosure applies to other configurations and types of beverage preparation machines and other configurations and types of cartridges. For example, this disclosure can be applied to cartridges that are received in a beverage preparation machine that does not have a rotatable and/or multi-chamber brew basket, to cartridges that are inverted (e.g., so that the top filter becomes the bottom filter) during brewing, to cartridges with other shapes and sizes, to cartridges without generally rigid walls, or otherwise. Also, although this disclosure describes certain embodiments and examples of beverage production machines, many aspects of the methods and devices shown and described in the present disclosure may be differently combined and/or modified to form still further embodiments or acceptable examples. All such modifications and variations are intended to be included herein within the scope of this disclosure. Indeed, a wide variety of designs and approaches are possible and are within the scope of this disclosure. No feature, structure, or element disclosed herein is essential or indispensable.

While illustrative embodiments have been described herein, the present disclosure also includes the scope of any embodiments having equivalent elements, modifications, omissions, combinations (e.g., of aspects across various embodiments), adaptations and/or alterations, as would be appreciated by those in the art based on the present disclosure. Although there may be some embodiments within the scope of this disclosure that are not expressly recited above or elsewhere herein, the present disclosure contemplates and includes all embodiments within the scope of what this disclosure shows and describes. Further, this disclosure contemplates and includes embodiments comprising any combination of any structure, material, element, or other feature disclosed anywhere herein with any other structure, material, element, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15°, 10°, 5°, 3°, 1°, 0.1°, 1 or otherwise. Similarly, in certain embodiments, the terms "generally perpendicular" and "substantially perpendicular" refer to a value, amount, or characteristic that departs from exactly perpendicular by less than or equal to 15°, 10°, 5°, 3°, 1°, 0.1°, or otherwise.

The language of the claims is to be interpreted broadly based on the language employed in the claims and not limited to the examples described in the present specification or during the prosecution of the application, which examples are to be construed as non-exclusive.

Some embodiments have been described in connection with the accompanying drawings. However, the figures are not drawn to scale. Distances, angles, etc. are merely illustrative and do not necessarily bear an exact relationship to actual dimensions and layout of the devices illustrated. Components can be added, removed, and/or rearranged. For example, in FIG. 7A, the boilers 114a, 118a, 120a (and their associated pressure/head losses) can be combined as a single component. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited elements.

In summary, various illustrative embodiments and examples of beverage production devices and methods have been disclosed. Although the beverage production devices and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The following is claimed:

1. A beverage preparation machine comprising:
   a reservoir configured to contain a brewing liquid;
   a pump in fluid communication with the reservoir;
   a brewing chamber in fluid communication with the pump, the brew chamber having a fluid entry port and fluid exit port and being configured to receive a cartridge comprising;
   a filter top having a top filter area;
   a filter bottom having a bottom filter area;
   an inner chamber; and
   a beverage component or precursor positioned in the chamber, the beverage component extending above the filter bottom by a bed depth;
   wherein the cartridge has a spread ratio defined by the ratio of the bed depth to the second filter area;
   wherein, when the cartridge is received in the brewing chamber, the brewing chamber comprises a head loss coefficient that is directly related to the spread ratio of the cartridge;
   a spout in fluid communication with the fluid exit port of the brewing chamber;
   the pump configured to encourage brewing liquid from the reservoir to the brewing chamber via piping;
   the pump configured to apply a pressure to the brewing liquid such that the brewing liquid passes through the top filter of the cartridge and into engagement with the beverage component or precursor to produce a beverage, the beverage being encouraged through the bottom filter and to the spout for dispensation; and
   the pressure applied by the pump creating a pressure differential between the fluid entry port and fluid exit port of the brewing chamber, the differential being a function of the head loss coefficient of the brewing chamber and being maintained at less than or equal to 6 psi.

2. The machine of claim 1, wherein the head loss coefficient is generally linearly related to the spread ratio.

3. The machine of claim 2, wherein the spread ratio is less than or equal to about 0.35.

4. The machine of claim 3, wherein the head loss coefficient is less than or equal to about 45.

5. The machine of claim 1, wherein the relationship between the head loss coefficient, k, the bed depth, $h_b$, and the bottom filter area, A, satisfies the equation: $k=C_1(h_b/A)-C_2$.

6. The machine of claim 5, wherein $C_1$ is between about 160 and about 200, and $C_2$ is between about 17 and about 27.

7. The machine of claim 6, wherein the pressure differential, $\Delta p$, satisfies the equation: $\Delta p=8\rho kV^2/\pi^2 t^2 D^4$, where V is the brew volume, $\rho$ is the brew liquid density, t is the brew time, and D is the hydraulic diameter of the fluid entry port.

8. The machine of claim 7, wherein V is between about 8 fluid ounces and about 16 fluid ounces, $\rho$ is the density of water, t is between about 80 seconds and about 100 seconds, and D is between about 0.1 inches and about 0.4 inches.

9. The machine of claim 1, wherein the beverage preparation machine does not pierce the cartridge.

10. The machine of claim 1, wherein the brewing chamber further comprises a brew basket comprising a first chamber and a second chamber.

11. The machine of claim 10, wherein:
    the brew basket is configured to rotate between a first position and a second position;
    when the brew basket is in the first position, the first chamber is upwardly oriented, thereby facilitating loading of the cartridge into the first chamber; and
    when the brew basket is in the second position, the first chamber is downwardly oriented, thereby facilitating ejection of the cartridge from the first chamber by force of gravity.

* * * * *